Sept. 3, 1957 W. G. SCHNEIDER 2,805,372
CONDENSER
Filed June 8, 1953
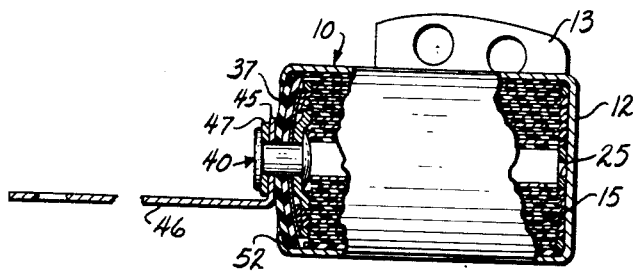
Fig. I
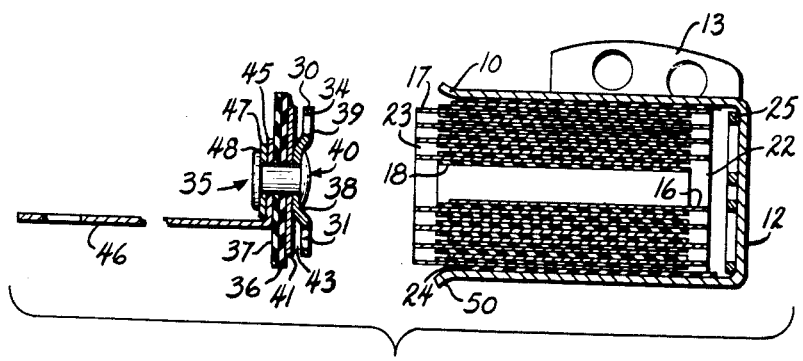
Fig. II
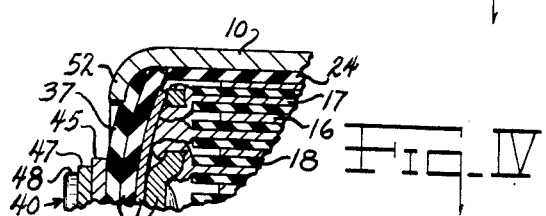
Fig. IV
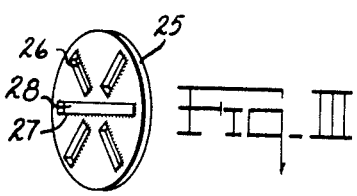
Fig. III
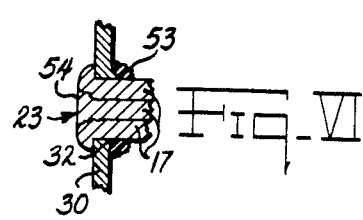
Fig. VI
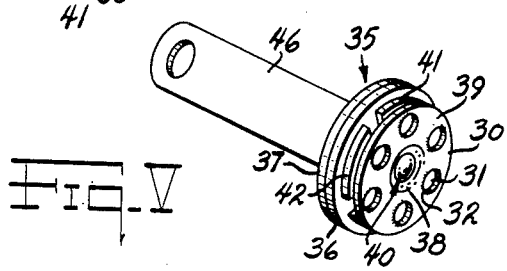
Fig. V
INVENTOR.
William G. Schneider
BY
Falvey, Souther & Stoltenberg
ATTORNEYS

United States Patent Office 2,805,372
Patented Sept. 3, 1957

2,805,372

CONDENSER

William G. Schneider, Maumee, Ohio

Application June 8, 1953, Serial No. 360,248

12 Claims. (Cl. 317—260)

This invention relates to capacitors for use in electrical circuits and more particularly to electrical condensers adapted to be used with internal combustion engine ignition systems.

The invention comprehends a condenser including an arrangement to provide an interlocked electrical contact of the condenser electrodes with the condenser terminals and which will permanently maintain, without relaxation, the components of the condenser assembly in the close and intimate relationship required to effectively exclude moisture.

The invention embraces a means and a method for causing the marginal portions of the convolutions or folds of the electrodes of a condenser to enter into firm, mechanical and electrical contact with conducting material having perforations with sharp edges for positively interconnecting at a plurality of points the condenser electrodes with the condenser circuit terminals.

The invention provides a condenser construction including spring means in association with apertured connecting means so arranged that portions of the condenser foil protruding said apertures are spread or crushed down by the deflection of the spring means to form a multipoint interlocked connection between the condenser body and the condenser terminals, concurrently producing by the reactive force of the deflected spring means a moisture-proof and air-tight assembly.

The invention is inclusive of a condenser assembly including spring means in association with current-conducting means apertured for the protrusion of portions of the condenser electrode to provide a multi-point connection, wherein the effectiveness of such multi-point connection is further increased when the spring means are deflected or put under pressure by causing not only the spring means to spread or mushroom the protrusions to form a multi-point interlocked connection but the take-up force of the spring means acts to permanently maintain the cover and container parts in tight relation providing a hermetically-sealed condenser at all times.

It is customary in condensers of the tubular type that after the strips of condenser foil or the like and the insulating wrappings therefor are wound to provide the desired capacitance, the resulting assembly is thereafter impregnated with wax for the purpose of improving the dielectric properties of the insulating wrappings and exclude moisture. It has been found that due to the presence of wax, that the electrical connection between the condenser foils and the condenser terminals has not been very effective and the condensers produced thereby have comparatively high electrical resistance and inductance. In addition, such type of connections are apt to jar loose under severe service conditions. The present invention overcomes and successfully cures the foregoing listed drawbacks by providing a condenser assembly wherein a multi-point interlocked connection is obtained by using connecting means provided with perforations or apertures with sharp edges properly directed for effectively scraping the wax and allowing the passage through the apertures of portions of the condenser foil wherein the wax has been effectively removed.

According to the foregoing summary of the invention, indicating its general nature and substance, one of its main objectives is to provide a moisture-proof and air-tight condenser capable of withstanding severe service conditions having a very low electrical resistance and inductance by permanently maintaining the container parts in tight relation and resiliently holding the cover and container parts under pressure and providing a multi-point interlocked electrical connection between the condenser body and the condenser terminals.

One object of the invention is to provide current-conducting means having perforations or apertures formed with properly directed sharp edges for assuring a very effective metal to metal contact at a plurality of points between the condenser electrodes and the terminals by which circuit connections are made.

One of the objects of the invention is the provision of a condenser in which the condenser body is tightly held under pressure in a container assembly in which the cover and container parts are resiliently urged together to form a hermetically-sealed container and concurrently maintain positive electric contact at a plurality of points between the condenser electrodes and the external terminals.

Another object of the invention is the provision of a fixed capacity condenser characterized by a high degree of mechanical and electrical stability having maximum surface area for its terminals and connections to effectively reduce the resistance to the flow of high frequency electric currents which can be produced at very low cost, being highly adaptable for mass production.

Another object of the invention is to provide electric conducting apertured material for making contact with the condenser electrodes at a plurality of points providing metal to metal interlocked communication of considerable surface area therebetween whereby the electrical resistance between the electrodes and the condenser terminals is reduced to a minimum and the same are at all times positively and firmly in electrical contact.

Among other objects of the invention is the improvement and cost reduction of a condenser assembly of the type disclosed in Patent No. 2,539,332 of Jan. 23, 1951.

Another object of the invention resides in a condenser construction including foils of condenser material alternating with dielectric means and conducting means having perforations with sharp edges for connecting one of the foils with the casing used as a circuit terminal and another foil with a conductor terminal scraping the impregnating wax of portions of the foils which extend or project into the apertures of said conducting means.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a view in side elevation of an electrical condenser embodying the invention with parts broken away and shown in section;

Fig. II is a sectional elevation of the condenser elements before being assembled;

Fig. III is an isometric view showing a preferred embodiment of the apertured or perforated connecting means of the invention;

Fig. IV is a fragmentary sectional view on an enlarged scale showing the condenser assembly adjacent to the cover;

Fig. V is an isometric view of the conductor terminal assembly of the invention;

Fig. VI is a fragmentary sectional view on an enlarged scale showing the interlocked connection between the condenser electrode and the aperture connecting means of the invention.

The invention may be incorporated in any type of electrical condensers and, for practical application of its principles, the same is illustrated in the drawings as embodied in a tubular wound condenser of a type highly adaptable for ignition systems of internal combustion engines. However, it is to be understood that the invention is not limited to the particular form illustrated and that it is contemplated to use the same wherever the invention may be found to have utility.

Referring to the drawings, 10 indicates the condenser case or enclosure which takes the form of a cup-like member provided with a uniplanar section or flat bottom metallic end wall 12. The case 10 is preferably made of suitable conducting material such as brass, aluminum or the like, and has affixed by brazing or other suitable fixing means, a mounting bracket 13 which, in the embodiment shown, constitutes one of the condenser circuit terminals or connecting post.

The case 10 is dimensioned to accommodate the condenser body 15 comprising a pair of foils or electrodes of condenser material 16 and 17 interleaved by suitable dielectric spacers or insulators 18 shown as wound on a mandrel to form a roll or tubular condenser body of a predetermined capacity and desired dimensions. However, the same could take the form of folds or pleats, as is the usual and well-known practice. The electrodes 16 and 17 with a suitable number of insulators or dielectric spacers 18 are wound to provide the desired fixed capacity in slightly offset relation such that the condenser foil or electrode 16 is disposed laterally of the center line to provide an exposed foil edge or bare margin 22 while the electrode 17 is offset on the opposite direction to provide the exposed foil edge or bare margin 23, as particulary shown in Figs. II and IV. The invention also includes the use of a condenser in which its electrodes or condenser plates are made of metallized dielectric material, preferably in the form of dielectrically spaced conducting webs or strips in offset relation to provide exposed plate edges or marginal conducting portions.

The condenser body 15 impregnated by a suitable dielectric preferably wax before its insertion into the open-ended enclosure 10 and a member of insulating material 24 is wrapped around the outer surface thereof, forming thereby a suitable insulating liner between the condenser body 15 and the surrounding enclosure 10. Prior to the insertion of the condenser body 15 with its insulator member 24 into the housing 10, the connecting means of the invention in the form shown in Fig. III is placed within the housing adjacent to the metallic end wall 12 to serve as an electrical connector 25 between the condenser electrode 16 and the metallic container 10 which forms one of the components of the circuit terminals of the condenser.

The connecting means of the invention that are preferred are illustrated in Figs. III and V in the form of a circular planar plate 25 and a disc-like member 30 made of suitable conducting material each provided with a plurality of perforations or apertures 26 and 31 respectively. The connecting members 25 and 30 may be made of sheet steel having a cadmium coating to enhance its electrical conductivity as well as to avoid the possibility of oxidation before final assembly. It is contemplated to form the perforations or apertures 26 and 31 with sharp surfaces or projecting rough boundaries 27 and 32 extending outwardly from their main body on either face or only from the surface positioned to face the margins of the condenser electrodes. The projecting edges 27 or 32 may take the form of surface burrs or thin ridges left by a tool or die in cutting or piercing the conducting sheet material.

The use of the connectors 25 and 30 with apertures or perforations 26 and 31 formed with sharp surfaces or rough boundaries 27 and 32 properly directed towards the condenser assures that substantially all of the impregnant or wax is effectively removed or scraped from portions of the margins of electrode projecting into the apertures, so that a metal to metal engagement between the connecting means 25 and 30 and the condenser electrodes or bare margins 22 and 23 is effectively secured. It is to be understood that the configuration of the apertures or perforations 26 and 31 may widely vary in size and shape as long as the size and configuration of the apertures provides a satisfactory open area to permit the projection or passage therethrough of the marginal ends or bare sections of each of the condenser electrodes. The configuration and size of the apertures, as well as the position of the sharp surfaces or projecting edges, is correlated and arranged so that when the condenser body 15 is assembled in the enclosure or housing 10, the connecting means of the invention, as embodied in the connectors 25 and 30, will establish an electrical connection at a plurality of contacting points with the marginal sections 22 and 23 of the electrodes and with the condenser terminals, by which connection to an outside circuit may be made.

In Fig. III of the drawings is shown the connector used to provide an electrical communication between the marginal section 22 of the condenser electrode 16 and the metallic end wall 12 of the casing 10, by which connection to an outside circuit may be made. As shown, the connector is in the form of a circular cadmium-coated steel plate 25 formed with a plurality of comparatively narrow rectangular openings 26, radially positioned about sixty degrees apart, some of which extend from a portion adjacent to the center of the plate toward its periphery. A pair of the openings 26 are interconnected forming a transverse rectangularly-shaped aperture 28 which takes the medium portion of the connector plate and is of a length slightly smaller than its diameter. The openings 26, as well as the composite opening 28, are bound by sharp edges or rough ridges 27 extending from the main body of the plate member 25 forming the impregnate or wax-removing means of the invention.

After the connector 25 is positioned at the bottom of the case 10 and the condenser body 15 with its surrounding tubular liner 24 are inserted therein, the open end of the case 10 is closed and effectively sealed by the non-conducting member of the insulated circuit terminal or lead-out connector of the condenser which constitutes the unitary sub-assembly 35. The non-conducting member of the lead-out connector comprises a comparatively rigid member 36 of insulating material covered by a rubber-like element forming an outer deformable liner or resilient layer 37. The member 36 with its coextensive resilient liner 37 is dimensioned to snugly fit the open end of the casing 10 and provide an effective closure therefor, as well as an insulating support for the connector 30 of the invention which is a component of the unitary sub-assembly 35.

The connector of the invention used to establish electrical communication with the marginal portion or exposed foil 23 of the electrode 17 is preferably in the form of a circular cadmium-plated steel disc 30 having a planar peripheral section with a centrally-depressed portion 38.

The peripheral section 34 of the connector 30 is formed with a plurality of spaced perforations or apertures 31 bound by sharp edges or ridges 32 extending from its front surface 39 forming the impregnate or wax-removing means of the invention. As particularly shown in Fig. V, the connector 30 has six equally spaced cylindrical perforations 31 each dimensioned to provide satisfactory open area for the projection of portions of the marginal end 23 of the condenser electrode 17 and the perforations are formed with sharp ridges 32 facing the condenser to remove the impregnate or wax of the portions passing through the aperture 31. The depressed portion 38 is provided with an aperture and is formed to accommodate the head of the fastening member or rivet 40, so that the same does not project beyond its planar section 34.

Located rearwardly of the connector 30, in direct contact with the depressed portion 38, is a centrally apertured, spring-like or deflectable member made of elastic or resilient material which may take the form of a slotted spring washer 41 with radially directed slots forming a plurality of broad ending fingers or distortable prongs 42. These prongs abut the inner face of the insulating member 36 providing an annular unobstructed space 43 with the rear face of the planar peripheral section 34 of the connector. The insulating member 36 with its resilient liner 37 is formed with a central opening dimensioned to provide a tight or press-fit with the shank of the rivet 40. The resilient liner 37 is tightly compressed by the end section 45 of the terminal or ribbon-like connector 46 through a retaining washer 47 which is forcibly urged by the upsetting or swedging of the end of the rivet as particularly shown at 48. The tight engagement provided between the parts of the unitary sub-assembly by the rivet 40 is particularly enhanced by the compression of the resilient liner 37 adjacent to its aperture, causing, by its distortion, a tight gripping contact between the rivet and the aperture of the insulating support, providing thereby an effective barrier which substantially eliminates the penetration or transmission of moisture, so that a water and moist-proof seal is obtained therebetween.

The closing and sealing of the open end of the casing 10 when the condenser body 15 with its liner 24 and connector 25 are housed therein is effected by inserting the leadout connector sub-assembly 35 and permanently holding the parts together under a compressive force having a predetermined value to cause the bending of the closure member 36, as well as the deflection of the resilient prongs 42 of the spring member 41 toward the connector 30. In order to facilitate such insertion, the casing 10 is preferably flared at its open end as particularly shown at 50. After the sub-assembly 35 is urged past the flared section 50, the compressible force of the desired predetermined value is applied thereto, and while the components of the condenser unit located in the casing 10 are forced together and held under such compressive force, the end of the casing is spun or crimped inwardly as shown at 52 in Fig. IV. The application of the predetermined force to the parts shown in Fig. II in assembled relation within the housing causes the projection and protrusion of portions of the marginal end 22 of the condenser into the openings 26 and 28 of the connector 25, as well as the protrusion and passage into the space 43 of portions of the marginal section 23 of the condenser through the openings 31 of the connector 30. In addition, by the application of such compressive force, the sharp surfaces or projecting ridges 27 and 32, which form the boundaries of the apertures 26 and 31 repectively of the connectors 25 and 30, insures that substantially all the impregnate or wax 53 is effectively removed or scraped from the projecting portions of the electrodes, so that direct metallic engagement at a plurality of points is secured between the connectors 25 and 30 with the corresponding marginal sections 22 and 23 of the condenser electrodes 16 and 17. By this arrangement, the marginal sections of the electrodes or foil edges not protruding through the respective openings of the connectors of the invention are effectively crushed down at both ends of the condenser body to effectively provide a non-inductive winding of the condenser electrodes.

The step of spinning the end of the case 10 to form the flange 52 while a predetermined force is applied to the condensed assembly furnishes means provided solely by the case for holding the closure in place and permanently retaining under an established compressive pressure all the elements located between the bottom wall 12 and the flange 52 after such predetermined force is removed. The value of the established compressive pressure is slightly modified when the predetermined pressure is removed due to the indentation or deformation of the rubber liner 37 by the reactive force of the deflectable member 41 urging the closure member 36 against the flange 52. The reactive force exerted by the bending of closure 36 and the deflection of the slotted spring-like member 41 when the components of the condenser are in assembled relation continuously maintains positive contacting engagement of the connectors 25 and 30 with the corresponding marginal sections 22 and 23 of the condenser electrodes, as well as of the connector 25 with the bottom wall 12 of the casing 10. This action positively insures that each one of the circuit terminals 13 and 46 of the condenser will be permanently maintained in direct electrical communication with the respective electrodes of the condenser inherently compensating for changes of dimensions due to temperature variations and tolerances in manufacture.

The take up or reactive force exerted by the distortion of the cover 36 and by the deflection of spring member 41 also acts to forcibly press the resilient liner 37 against the retaining flange 52 causing its indentation or deformation and thereby insuring a very effective seal against the ingress of moisture between the rubber liner 37 and thereby the closure 36 with the retaining flange 52 of the casing 10. The spring-like member or slotted washer 41 performs the dual function of insuring a permanent electrical contact between the outside circuit terminals and the electrodes of the condenser winding and also effects a permanent sealing pressure between the closure member 36 and condenser case 10. This dual function is effectively performed irrespective of tolerances in manufacture and changes of dimensions due to temperature variations.

The predetermined value of the compressive force used in sealing the condenser should be correlated to the characteristics and dimensions of the members 36 and 41, so that its value will cause the bending of the nonconductive member 36 toward the connector 30 and effect the deflection of the prongs 42 of the deflectable member 41 to mushroom the projecting extremities 54 of the marginal electrode section 23. Thus, in carrying the invention to practice, the arrangement should provide means to cause the removal of the impregnant 53, as well as the spreading of the electrode projecting portions as shown in Fig. VI, producing an inter-locking electrical and mechanical connection of the connector 30 and the electrode 17 wherein the direct area of contacting engagement is further enhanced by the non-relaxing pressure provided.

In the embodiment of the invention shown, the leadout connector takes the form of a single conductor 46 of ribbon-like shape made of conductive material, preferably copper. I have found, and verified by tests, that by the use of a single connector of large surface area, preferably of a ribbon-like shape, a material reduction of the effective resistance and inductance of the condenser is secured, which is a very important factor for its use in ignition systems for high speed engines. The use of a single conductor of large area in association with the protrusion of portions of the electrodes through the perforations of connectors 25 and 30, coupled with the firm and intimate engagement of the crushed down portions of the electrodes with the non-perforated sections of the connectors, as well as the mushrooming action obtained by the deflectable prongs 42, provides and maintains, without relaxation, a positive electrical and mechanical contact between the electrodes and the circuit terminals at a large number of points. Thus, by the arrangement of the present invention, the overall electrical resistance, as well as the impedance of the condenser assembly, is reduced to a minimum, and such minimum values are maintained under the most severe service conditions.

It should be particularly pointed out that by the arrangement of the component parts of the condenser of the invention, hereinbefore described, all the electrical connections are continuously maintained and positively established without the use of skilled labor, special apparatus, or time-consuming operations which are at present required when soldered connections are utilized. Thus, by the present invention, the cost of producing a condenser is materially reduced, and the same can be fabricated under automatic mass production manufacture.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A condenser comprising, in combination, an open tubular metallic case having an integral end wall, a cover for the open end of the case, a tubular body of condenser material comprising a plurality of insulated foil elements adapted to be located within the case with offset projecting marginal foil portions, uniplanar current-conducting means apertured for the passage therethrough of marginal portions of the foils for connecting one of the foil elements with the case, a terminal conductor insulated from the case and passing through the cover, second current-conducting means having a planar peripheral surface spaced from the cover and apertured for connecting said terminal conductor with another of said foil elements by the protrusion of marginal portions of another of the foil elements in the apertures, a multi-prong spring disc located between said cover and said second current-conducting means, with its outer sections in spaced relation to said apertured surface and means including a part of the case for attaching the cover to the case for holding the condenser body under a compressive force having a predetermined value and concurrently deflecting the cover and the prongs of said spring toward said apertured surface to engage the marginal portions of the foil elements protruding said second conducting means for spreading the same forming an interlocking connection therebetween and the reactive force of the said spring disc maintains the cover under pressure against its attaching case part forming thereby a hermetically-sealed condenser.

2. A condenser comprising, in combination, a case having an open end and formed with a metallic end wall, a cover for the open end of the case, a body of condenser material having margins which extend beyond spacing dielectric means therefor adapted to be located within the case, current-conducting means apertured for the passage therethrough of portions of one of the electrode margins for connecting the condenser with the metallic end wall of said case, a terminal conductor passing through the cover, a second current-conducting means having a centrally depressed section and a surface spaced from the cover apertured for connecting said terminal conductor with another of said margins by the protrusion of portions thereof in its aperture, a deflectable spring like member contacting said cover and the depressed section of said second current-conducting means, and means including a part of the case for attaching the cover to the case and permanently holding the parts within the case under a compressive force having a predetermined value causing the bending of the cover for deflecting the said spring like member to mushroom portions of the bare margin protruding said second conducting means whereby the reactive force of said spring like member maintains the cover under pressure against its attaching case part forming thereby a permanent moisture proof condenser.

3. In an electrical condenser comprising, in combination, a condenser body including electrodes of condenser material having bare margins which extend beyond spacing dielectric means therefor, a metallic case substantially enclosing said condenser body and having an open end, a non-conducting cover for the open end of said case, means provided solely by the end of the case for holding said condenser body under a compressive force having a predetermined value by bending said cover sealing said condenser in said case, a metal terminal supported by the cover and having a conducting part extending within the case, a connector attached to the conducting part of said metal terminal provided with perforations having properly directed sharp edges for the protrusion of portions of the bare margins of one of said condenser electrodes forming a positive metal to metal connection at a plurality of points with said condenser electrode, resilient means interposed between the conducting part of said metal terminal and said connector, a current-conducting member formed with a plurality of apertures having properly directed sharp edges for the passage of the bare margin of another of the condenser electrodes acting as positive metal to metal connecting means between said condenser electrode and said casing, said cover and resilient means are placed by the end of said case under deflection for performing the double function of urging the cover into sealing engagement with the case and effecting an interlocking connection with the bare margins of said condenser electrodes.

4. In an electrical condenser comprising, in combination, a condenser body including electrodes of condenser material having bared margins which extend beyond spacing dielectric means therefor, a metallic case substantially enclosing said condenser body and having an open end, a non-conducting cover for the open end of said case, a metal terminal supported by the cover and having a conducting part extending within the case, a connector attached to the conducting part of said metal terminal and formed with an outer portion spaced therefrom provided with apertures for the protrusion of portions of the bare margins of one of said condenser electrodes forming a connection at a plurality of points with said condenser electrode, resilient means interposed between the conducting part of said metal terminal and said connector, a second connector formed with a plurality of apertures for the passage of portions of the bare margin of another of the condenser electrodes acting as connecting means between said condenser electrode and said case, means provided solely by the case for holding said condenser with both of said connectors in tight engagement under a compressive force having a predetermined value by bending said cover and placing said resilient means under deflection so that said resilient means perform the double function of urging the cover into sealing engagement with the case and effecting the spreading of the portions protruding said connector for forming an interlocking connection with the bare margin of said condenser electrode.

5. Connectors for establishing an electrical connection between electrodes of an impregnated condenser body and conductor terminals by which connection to an outside circuit may be made, each connector comprising a disc-like member of current-conducting material having uniplanar sections, said uniplanar sections formed with apertures for the protrusion of portions of the condenser electrodes, said apertures formed with properly directed sharp edges for effectively scraping the impregnate of the portions of the condenser electrodes in passing therethrough to effect a plural metal to metal contact between the condenser electrode and the connectors, said connectors adapted to be placed under pressure of a predetermined value to cause distortion of the electrodes in engagement with said connectors and tightly embrace without relaxation the portions of the electrodes projecting from said apertures effecting a permanent interlocked connection between the condenser electrodes and the connectors.

6. Connectors for establishing a multipoint electrical connection with the electrodes extending at each end of a condenser body, each connector comprising a disc-like member of current conducting material having a uniplanar section, said uniplanar section formed with perforations dimensioned for the projection of portions of the condenser electrode, said perforations bound by sharp edges on the surface facing the electrode for removing the impregnate as the portions of the condenser electrode project into said perforations, and said connectors adapted to be placed in contact with each electrode to be urged under pressure toward said condenser body of a predetermined value to crush down the corresponding electrode in engagement with the non-perforated surface of said connectors and to be in tight embrace with portions of the electrodes projecting into said apertures producing thereby a constantly maintained interlocked multi-point metal-to-metal connection between the condenser electrodes and said connectors.

7. A connector to provide an electrical connection between an electrode of a condenser and a conducting member by which connection to an outside circuit may be made, the connector comprising a current-conducting member having an outer section formed with a plurality of apertures for the projection of portions of the electrode to provide intimate and plural engagement between the member and the electrode, the apertures formed on the current-conducting member bound on the surface facing the electrode by sharp edges to remove the impregnate as the portions of the electrode project into said apertures for effecting positive metal to metal engagement at a plurality of points between the condenser electrode and the current-conducting member, a deflectable member of spring like material located rearwardly of said current-conducting member and operable when placed under pressure to mushroom the portions of the electrode projecting through said apertures for effecting an interlocked connection between the electrode and the current-conducting member.

8. In an electrical condenser comprising, in combination, a condenser body including electrodes of condenser material having their margins extending beyond spacing dielectric means therefor, a case for enclosing said condenser body having an open end, a cover for the open end of said case, an external circuit terminal supported by the cover with a conducting part extending within the case, a connector attached to said conducting part formed with a portion spaced from said cover, said spaced portion provided with apertures for the protrusion of portions of the margin of one of said condenser electrodes to establish a connection at a plurality of points with said condenser electrode, resilient means located between the said cover and said connector, and means provided solely by the case for subjecting under a compressive force having a predetermined value the condenser body by holding the cover in place causing the simultaneous deflection of the cover and resilient means towards the spaced portion of said connector, the deflection of the resilient means performing the double function of urging the cover into sealing engagement with the case and forming an interlocked connection with the margin of said condenser electrode.

9. In an electrical condenser, a connector adapted to provide electrical communication between a condenser electrode and a terminal by which connection to an outside circuit may be made, the connector comprising a disc-like conducting member formed with a centrally recessed portion and an outer section having apertures for the projection therethrough of portions of the condenser electrode, said apertures arranged with properly directed edges by means of which an impregnate is removed as the said electrode portions project through said apertures providing thereby metal to metal contact between the electrode and said connector, a disc-like spring with a central portion in direct engagement with the rear face of the recessed portion of said conducting member and with its outer section spaced therefrom, a ribbon-like terminal conductor having an electrical connection with said conducting member, and said spring member adapted to be placed under deflection so that its outer section is moved toward the outer section of said conducting member to effect the spreading of the portion of the condenser electrode projecting through said apertures to form an interlocked connection between the conductor electrode and said conducting member and concurrently crushed down the condenser electrode portion in engagement with the non-apertured section of said connectors.

10. A connector to provide an electrical connection between a condenser body having metallic impregnated margins and a terminal by which connection to an outside circuit may be made, the connector comprising a current-conducting member formed with a plurality of apertures to provide intimate and plural engagement between the said current-conducting member and the condenser margin by the protrusion of portions of the margin of the condenser therethrough, said apertures bound with properly directed edges to remove the impregnate as the portion of said margin passes through said apertures for effecting positive metal to metal engagement at a plurality of points between the condenser and the current-conducting member, a deflectable spring member located adjacent said current-conducting member with a peripheral portion spaced therefrom and being operable when placed under pressure to deflect said peripheral portion toward said conducting member to mushroom the portion of the condenser margin projecting said apertures for effecting an interlocked connection between the condenser margin and the current-conducting member and thereby maintain positive engagement at a plurality of points therebetween.

11. The method of manufacturing a hermetically sealed condenser which comprises placing at the bottom of a metallic open-ended case a connector plate having a plurality of apertures; inserting in the case a condenser body having marginal electrodes extending at the top and bottom ends to cause direct engagement of said connector plate with the bottom marginal electrode; inserting in the case for direct contact with the top marginal electrode a connector having a plurality of apertures at its outer section and a central outwardly recessed section in direct engagement with a spring disc-like member which is connected to a terminal member supported by an insulated cover; applying a compressible force of predetermined value to cause the crush down of portions of the marginal electrodes of said condenser in engagement with the non-apertured sections of said connectors and simultaneously causing the protrusion of portions of the condenser electrodes through said apertures and concurrently deflecting the cover and the outer section of the spring member to mushroom the portions of the electrode projecting from said aperture; and permanently holding said condenser body, connectors, spring member and cover under a predetermined compressive force by spinning inwardly the end of said case over the deflected cover to produce a hermetically sealed condenser and permanently maintaining an interlocked electrical connection at a plurality of points between the condenser electrode and connector after the applied pressure is removed.

12. The method of manufacturing a hermetically sealed condenser which comprises placing at the bottom of a metallic open-ended case a connector plate having a plurality of apertures arranged to provide properly directed edges, inserting in the case a condenser body with impregnated marginal electrodes extending at the top and bottom ends to cause direct engagement of said connector plate with the bottom marginal electrode; inserting in the case for direct contact with the top marginal electrode a connector having a plurality of apertures arranged to provide properly directed edges at its outer section and a central outwardly recessed section in direct engagement with a spring disc-like member which is connected to a terminal member supported by an insulated cover snugly fitting the open end of said case; applying a compressible force of predetermined value to cause the crush down of portions of the marginal electrodes of said condenser in engagement with the non-apertured sections of said connectors and simultaneously causing the protrusion of portions of the condenser electrodes through said apertures scraping the impregnate by its directed edges as the portions project into the apertures and concurrently deflecting the cover and the outer section of the spring member to mushroom the portions of the electrode projecting from said aperture; and permanently holding said condenser body, connectors, spring member and cover under a predetermined compressive force by spinning inwardly the end of said case over the deflected cover while said predetermined composite force is being applied to produce a hermetically sealed condenser providing a permanent multi-point electrical connection between the condenser electrode and connectors.

References Cited in the file of this patent

UNITED STATES PATENTS

| | | |
|---|---|---|
| 1,796,855 | Ahlers | Mar. 17, 1931 |
| 2,323,124 | Edmundson | June 29, 1943 |
| 2,333,266 | Miller | Nov. 2, 1943 |
| 2,450,423 | Fraser | Oct. 5, 1948 |
| 2,455,136 | Obert | Nov. 30, 1948 |
| 2,535,517 | Rhodes | Dec. 26, 1950 |
| 2,539,332 | Schneider | Jan. 23, 1951 |